March 5, 1963   C. LOWERY   3,079,892
POULTRY WATERING FOUNTAIN
Filed Nov. 3, 1961   2 Sheets-Sheet 1
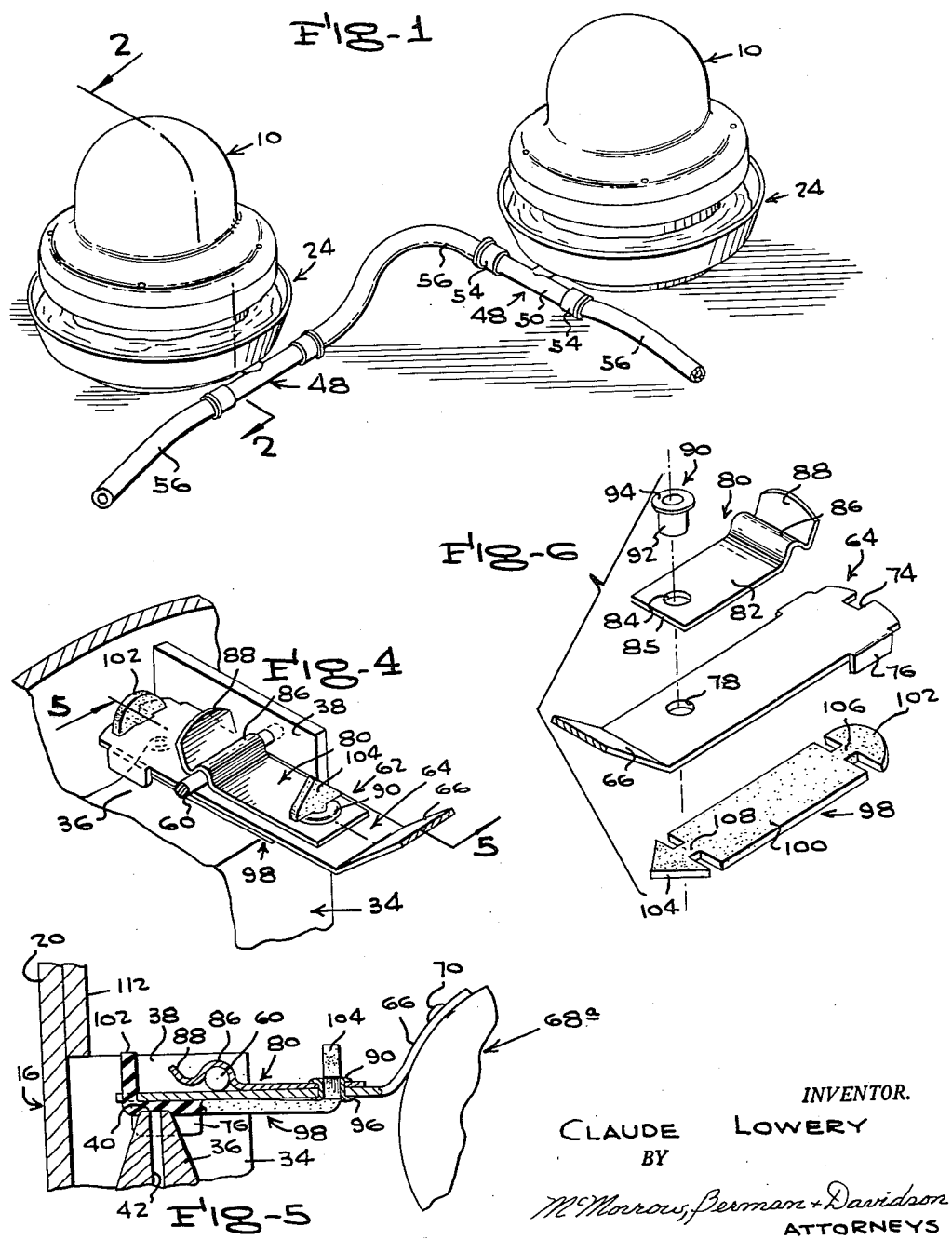
INVENTOR.
CLAUDE  LOWERY
BY
McMorrow, Berman + Davidson
ATTORNEYS

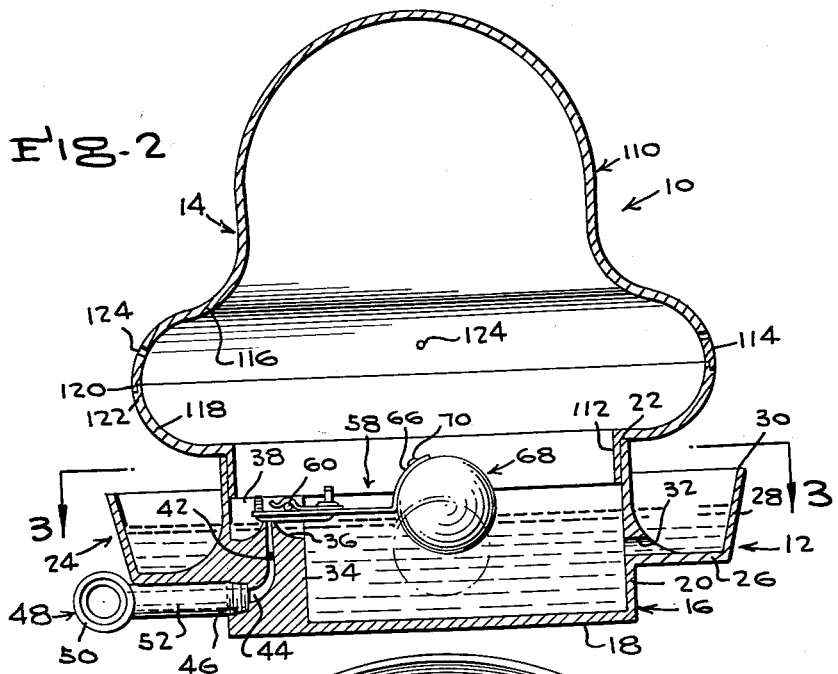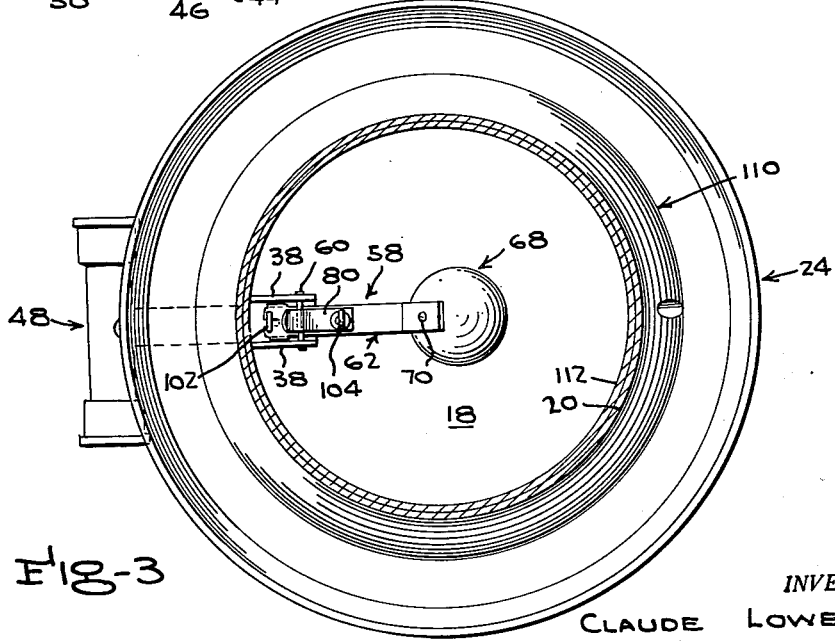

ized Mar. 5, 1963

3,079,892
POULTRY WATERING FOUNTAIN
Claude Lowery, Langley, Ark.
Filed Nov. 3, 1961, Ser. No. 149,904
6 Claims. (Cl. 119—79)

This invention relates to a novel poultry watering fountain.

The primary object of the invention is the provision of a more efficient, reliable, and practical device of the kind indicated, having improved float-operated valve means for automatically maintaining the proper level of water supplied to the device under pressure, a number of the devices being capable of being supplied by a single water conduit.

Another object of the invention is the provision of valve means of the character indicated above which involves a resilient and compressible valve element which is readily replaceable when worn or otherwise impaired, without major disassembling of the valve structure.

Other important objects and advantageous features of the invention will be apparent from the following description and the accompanying drawings, wherein, for purposes of illustration only, a specific form of the invention is set forth in detail.

In the drawings:

FIGURE 1 is a perspective view showing a plurality of devices of the present invention connected to a common water supply hose;

FIGURE 2 is an enlarged vertical transverse section taken on the line 2—2 of FIGURE 1;

FIGURE 3 is a horizontal section taken on the line 3—3 of FIGURE 2;

FIGURE 4 is a further enlarged fragmentary perspective view, partly broken away and in section, showing the valve assembly in closed position;

FIGURE 5 is a vertical longitudinal section taken on the line 5—5 of FIGURE 4, and showing another form of float; and FIGURE 6 is an exploded perspective view showing the components of the valve mechanism.

Referring in detail to the drawings, wherein like numerals designate like parts throughout the several views, the illustrated device, comprises a housing, generally designated 10, which is preferably made of plastic and which comprises a lower water container section 12 and an upper cover section 14.

The water container section 12 is preferably circular, as shown, and comprises a cylindrical pan-shaped, open top container 16 having a flat bottom wall 18 and an upstanding side wall 20 having a free horizontal upper edge 22. An annular drinking trough 24 surrounds the container 16 and is fixed thereon or integral therewith, and has a flat bottom wall 26 which is spaced upwardly from the bottom of the container, and an upstanding side wall 28 which flares upwardly relative to the container side wall 20. The upper edge 30 of the trough side wall 28 is spaced below the upper edge 22 of the container side wall 20. A horizontal passage 32 extends through the wall 20, on a level with the bottom wall 26, and provides for free flow of water from the container into the trough.

At a point preferably diametrically opposite the passage 32, the container side wall 20 has a radial, vertically extending enlargement or block 34, here shown as being rectangular in cross section. The upper end of the enlargement is formed to provide an upstanding conical valve seat 36, spacedly positioned between a pair of upstanding side walls 38. The valve seat 36 has a flat upper end 40, and a passage in the enlargement 34 comprises a vertical lower portion 44 which opens to a threaded socket 46.

The socket 46 opens to the exterior of the container side wall 20, immediately below the drinking trough 24. A T-fitting 48 has a cross head 50 and an arm 52, the arm 52 being threaded into the socket 46, and the ends of the cross head 50 having hose couplings 54, on its ends, to which sections 56 of a pressure water supply hose are connected, as shown in FIGURE 1, which illustrates the manner in which a plurality of devices of the invention can be supplied with water from a single hose.

A float valve assembly, generally designated 58, comprises a pivot pin 60 extending between and secured through the side walls 38 on the enlargement 34, at the inward side of and on a level above the upper end 40 of the valve seat 36, and a valve arm 62 which is pivotally secured thereon. The valve arm 62 comprises an elongated flat rigid bar 64 having an upwardly and longitudinally inwardly angled end portion 66, which is arcuate, as shown in FIGURE 2, and conformably engages a side and the top of a spherical float 68 and is fixed thereto, as indicated at 70; or which is straight and has a horizontal terminal 72 which bears upon the top of and is suitably secured to an elongated cylindrical float 68a, as shown in FIGURE 5. The outer end of the bar 64 is formed with a central notch 74, and short longitudinal flanges 76 extend downwardly from the side edges of the bar 64, adjacent its outer end, to bear, at times, against the side walls 38, for spacing the bar 64 therefrom for free action. A centered hole 78 is provided in the bar 64, at a location nearer to the inward end portion 66 than to its outer end.

The valve arm 62 further comprises an elongated flat leaf spring 80, substantially shorter than the bar 64, which has a plane main portion 82, having a centered hole 84, similar to the hole 78, near to its inward end 85. The main portion 82 merges, at its outward end, into an S-curved terminal which comprises an upstanding concavo-convex transverse saddle 86 and an upwardly curved handle lip 88. The spring 80 is secured in place upon the bar 64 by means of a soft hollow rivet 90 having a stem 92 which is passed downwardly through the holes 78 and 84 until its upper lateral flange 94 bears upon the upper surface of the spring 80, whereupon the lower end of the stem 92 is swaged against the underside of the bar 64, as indicated at 96.

An elongated flat resilient and compressible valve element 98 comprises a main portion 100 which extends along and is engaged with the underside of the valve arm bar 64, between the notch and the rivet 90, and outer and inner heads 102, 104, respectively, which are engaged removably through the notch 74 and the bore of the rivet 90, respectively. The outer head 102 is preferably semicircular, as shown in FIGURE 6 and is connected to the main portion 100 by a narrow centered neck 106, which is narrow enough to be received in the notch 74 when pulled upwardly therethrough. The inner head 104 is preferably triangular and is connected to the main portion 100 by a centered neck 108 which is narrow enough to be received in substantially undistorted condtion in the bore of the rivet 90, once the head 104 has been compressed and distorted and forced upwardly through the bore of the rivet. The heads 102 and 104 bear severally upon the upper surface of the bar 64 and the upper end of the rivet 90, respectively, to hold the valve element 98 in place.

The valve arm 62 is rockably engaged on the pivot pin 60 by snapping the terminal of the spring 80 over the pin 60, so that the saddle 86 receives the pin 60 and tightly grips the pin 60 between itself and the upper surface of the bar 64, as shown in FIGURES 4 and 5, whereby the valve arm 62 is held in pivoted relation to the pin 60.

In operation, water first enters the container 16, under some pressure, through the passages 42, 44, from the T-fitting 48, with the valve arm 62 overbalanced by the weight of the float 68 or 68a and the valve element 98 elevated from the upper end 40 of the valve seat 36, and moves through the passage 32 into the trough 24. When the desired level of water in the trough 24 is attained, the valve arm 62 having been elevated by the rise of the float, the valve element 98 engages the upper end 40 of the valve seat 36 and closes the upper end of the passage 42, so that flow of water into the container 16 is cut off, until the water level subsides sufficiently to depress the valve arm 62 and elevate the valve element 98 off the valve seat 36.

The container 16 is closed by the upper cover section 14, which is removably engaged thereon, and comprises an open bottom hollow dome 110 having a short annular neck 112, on its lower end, which seats within the container side wall 12. The dome 110 has an annular outwardly extending hollow arcuate bulge 114, at its lower end, which rests upon the upper edge 22 of the container side wall 20.

The dome 110 is preferably formed of separable upper and lower sections 116 and 118, respectively, each of which includes about half of the bulge 114, the sections having inter-engaged grooves and ribs 120 and 122. The dome 110 is provided with vent holes 124 spaced therearound, and preferably formed in the upper dome section 116, to accommodate rise and fall of water in the container 16.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A poultry watering fountain comprising a pan-shaped container having a side wall and a bottom wall, a trough on and surrounding said side wall, said trough having a bottom wall spaced above the bottom wall of the container, a horizontal passage extending through the container side wall into the trough, a radially vertically extending enlargement on the container side wall, said enlargement having an upwardly facing valve seat on the upper end on a level above said horizontal passage, a vertical passage in said enlargement opening to said valve seat and opening to the exterior of the container side wall, and a float equipped valve arm pivoted on said enlargement and having a valve element to engage the valve seat and close the vertical passage, in a water elevated position of the valve arm, and means for connecting a supply of water under pressure to said vertical passage.

2. A poultry watering fountain comprising a pan-shaped container having a side wall and a bottom wall, a trough on and surrounding said side wall, said trough having a bottom wall spaced above the bottom wall of the container, a horizontal passage extending through the container side wall into the trough, a radially vertically extending enlargement on the container side wall, said enlargement having an upwardly facing valve seat on its upper end on a level above said horizontal passage, a vertical passage in said enlargement opening to said valve seat and opening to the exterior of the container side wall, and a float equipped valve arm pivoted on said enlargement and having a valve element to engage the valve seat and close the vertical passage, in a water elevated position of the valve arm, and means for connecting a supply of water under pressure to said vertical passage, and a vented cover removably seated on and closing the container.

3. A poultry watering fountain comprising a pan-shaped container having a side wall and a bottom wall, a trough on and surrounding said side wall, said trough having a bottom wall spaced above the bottom wall of the container, a horizontal passage extending through the container side wall into the trough, a radially vertically extending enlargement on the container side wall, said enlargement having an upwardly facing valve seat on the upper end on a level above said horizontal passage, a vertical passage in said enlargement opening to said valve seat and opening to the exterior of the container side wall, and a float equipped valve arm pivoted on said enlargement and having a valve element to engage the valve seat and close the vertical passage, in a water elevated position of the valve arm, and means for connecting a supply of water under pressure to said vertical passage, and a vented cover removably seated on and closing the container, said cover being hollow and comprising a dome having an open lower end, a pendant neck surrounding the lower end of the dome and removably seated in the container, and an annular bulge on the dome above said neck bearing upon the upper edge of the container side wall.

4. A poultry watering fountain comprising a pan-shaped container having a side wall and a bottom wall, a trough on and surrounding said side wall, said trough having a bottom wall spaced above the bottom wall of the container, a horizontal passage extending through the container side wall into the trough, a radially vertically extending enlargement on the container side wall, said enlargement having an upwardly facing valve seat on its upper end on a level above said horizontal passage, a vertical passage in said enlargement opening to said valve seat and opening to the exterior of the container side wall, and a float equipped valve arm pivoted on said enlargement and having a valve element to engage the valve seat and close the vertical passage, in a water elevated position of the valve arm, and means for connecting a supply of water under pressure to said vertical passage, and a vented cover seated on and closing the container, said cover being hollow and comprising a dome having an open lower end, a pendant neck surrounding the lower end of the dome and removably seated in the container, and an annular bulge on the dome above said neck bearing upon the upper edge of the container side wall, said dome comprising separable upper and lower sections.

5. A poultry drinking fountain comprising a pan-shaped container having a bottom wall and a side wall, a trough on and surrounding said side wall, a horizontal passage through said side wall into the trough, a radially vertically extending enlargement on said side wall, the upper end of said enlargement being formed with a pair of spaced side walls and an upstanding valve seat positioned between the enlargement side walls, said valve seat having an upper end, a vertical passage in said enlargement opening at its upper end to the upper end of the valve seat and opening at its lower end through the container side wall for connection to a source of water under pressure, a pivot pin extending between the enlargement side walls at the inward side of the valve seat, and a float equipped valve arm pivoted intermediate its ends on said pin and having a compressible valve element on its underside engageable with the upper end of the valve seat for closing off said vertical passage, said valve arm comprising a rigid bar having an outward end and having a float on its inward end, a leaf spring secured to and overlying and extending along said bar, said spring having a transverse saddle at its outward end engaged over the pivot pin, said valve element comprising an elongated flat main portion of resilient and compressible material extending along and engaged with the underside of said bar, and means on the ends of said main portion securing said main portion to the valve arm.

6. A poultry drinking fountain comprising a pan-shaped container having a bottom wall and a side wall, a trough on and surrounding said side wall, a horizontal passage through said side wall into the trough, a radially vertically extending enlargement on said side wall, the upper end of said enlargement being formed with a pair of spaced side walls and an upstanding valve seat positioned between the enlargement side walls, said valve seat having an upper end, a vertical passage in said enlargement opening at its upper end to the upper end of the valve seat and opening at its lower end through the container side wall for connection to a source of water under pressure, a pivot pin extending between the enlargement side walls at the inward side of the valve seat, and a float equipped valve arm pivoted intermediate its ends on said pin and having a compressible valve element on its underside engageable with the upper end of the valve seat for closing off said vertical passage, said valve arm comprising a rigid bar having an outward end and having a float on its inward end, a leaf spring secured to and overlying and extending along said bar, said spring having a transverse saddle at its outward end engaged over the pivot pin, said valve element comprising an elongated flat main portion of resilient and compressible material extending along and engaged with the underside of said bar, and means on the ends of said main portion securing said main portion to the valve arm, said spring and said bar having registered holes, a hollow rivet having a stem engaged through the holes and a lateral flange on its upper end bearing upon the leaf spring and a lateral flange on its lower end bearing against the underside of the bar, said bar having a notch in its outward end, said securing means comprising outer and inner heads on the ends of the main portion of the valve element, narrow necks connecting the heads to the main portion, the neck of the outer head being upwardly engaged through said notch and the neck of the inner head being upwardly engaged through the bore of the rivet, the outer head being engaged with the upper surface of the bar and the inner head being engaged with the upper end of the rivet.

References Cited in the file of this patent

UNITED STATES PATENTS

| | | |
|---|---|---|
| 1,162,539 | Zimmerman | Nov. 30, 1915 |
| 2,059,359 | Karges | Nov. 3, 1936 |
| 2,150,499 | Glotz | Mar. 14, 1939 |
| 2,435,015 | Olson | Jan. 27, 1948 |
| 2,623,500 | Riley et al. | Dec. 30, 1952 |